US011371426B2

(12) United States Patent
Loesch et al.

(10) Patent No.: US 11,371,426 B2
(45) Date of Patent: Jun. 28, 2022

(54) RECIPROCATING PISTON MACHINE AND METHOD AND DEVICE FOR DIAGNOSING AND/OR CONTROLLING A RECIPROCATING PISTON MACHINE

(71) Applicant: AVL LIST GMBH, Graz (AT)

(72) Inventors: Siegfried Loesch, Graz (AT); Thomas Huettner, Dexter, MI (US); Simon Paterno, Graz (AT); Robert St John, Graz (AT)

(73) Assignee: AVL LIST GMBH, Graz (AT)

( * ) Notice: Subject to any disclaimer, the term of this patent is extended or adjusted under 35 U.S.C. 154(b) by 845 days.

(21) Appl. No.: 16/306,019

(22) PCT Filed: May 31, 2017

(86) PCT No.: PCT/EP2017/063204
§ 371 (c)(1),
(2) Date: Jul. 18, 2019

(87) PCT Pub. No.: WO2017/207659
PCT Pub. Date: Dec. 7, 2017

(65) Prior Publication Data
US 2019/0345872 A1    Nov. 14, 2019

(30) Foreign Application Priority Data

May 31, 2016    (AT) ................................ A50499/2016

(51) Int. Cl.
*G01M 15/06* (2006.01)
*F16J 10/02* (2006.01)
(Continued)

(52) U.S. Cl.
CPC ............ *F02B 77/083* (2013.01); *F02D 15/00* (2013.01); *F16J 10/02* (2013.01); *G01M 15/06* (2013.01)

(58) Field of Classification Search
CPC ...... F02B 77/083; F02B 75/045; F02D 15/00; F02D 15/02; F02D 35/02; F02D 41/009;
(Continued)

(56) References Cited

U.S. PATENT DOCUMENTS 2,217,721 A    10/1940 Anthony
2,989,954 A    6/1961  Hulbert
(Continued)

FOREIGN PATENT DOCUMENTS

AT    512334    7/2013
AT    514071    10/2014
(Continued)

OTHER PUBLICATIONS

Official Action with English Translation for China Patent Application No. 201780047419.4, dated Apr. 2, 2021, 19 pages.
(Continued)

*Primary Examiner* — Phutthiwat Wongwian
*Assistant Examiner* — Arnold Castro
(74) *Attorney, Agent, or Firm* — Sheridan Ross P.C.

(57) ABSTRACT

The invention relates to a reciprocating piston machine, in particular with a variable compression ratio, of at least one cylinder with a piston and a connecting rod which is connected to the piston and to a crankshaft of the reciprocating piston machine. The reciprocating piston machine also has a first sensor which is arranged in a cylinder wall of the at least one cylinder and is configured to detect relative movement between a piston skirt of the piston and the cylinder wall. The invention further relates to a method (100) for diagnosing and/or controlling such a reciprocating piston machine (1), in particular with a variable compression ratio, and a system which is suitable therefor.

24 Claims, 9 Drawing Sheets

(51) Int. Cl.
  *F02B 77/08* (2006.01)
  *F02D 15/00* (2006.01)
(58) Field of Classification Search
  CPC .......... F02D 41/22; F16J 10/02; Y02T 10/40; G01M 15/06
  See application file for complete search history.

(56) References Cited

U.S. PATENT DOCUMENTS

| | | | |
|---|---|---|---|
| 5,379,634 | A | 1/1995 | Kuroda et al. |
| 6,453,854 | B1 | 9/2002 | Baeuerle et al. |
| 6,536,266 | B1* | 3/2003 | Akimoto ............ G01M 15/042 73/114.01 |
| 9,828,909 | B2 | 11/2017 | Paul |
| 9,964,031 | B2 | 5/2018 | Balling et al. |
| 2008/0173079 | A1* | 7/2008 | McGee ............... F02D 41/009 73/114.26 |
| 2008/0196697 | A1* | 8/2008 | Kein ................. F02D 41/0087 123/491 |
| 2014/0174395 | A1* | 6/2014 | Richerson ............. F02F 3/00 123/193.6 |
| 2014/0175940 | A1* | 6/2014 | Klostermann ......... H02N 10/00 310/306 |
| 2015/0152794 | A1 | 6/2015 | Paul |
| 2016/0069768 | A1 | 3/2016 | Johansson et al. |
| 2016/0237889 | A1 | 8/2016 | Melde-Tuczai et al. |
| 2018/0238228 | A1 | 8/2018 | Salzgeber et al. |

FOREIGN PATENT DOCUMENTS

| | | |
|---|---|---|
| CN | 101680364 | 3/2010 |
| CN | 104043656 | 9/2014 |
| CN | 104321517 | 1/2015 |
| DE | 4026492 | 2/1992 |
| DE | 4315463 | 5/1994 |
| DE | 19757871 | 7/1999 |
| DE | 19858245 | 6/2000 |
| DE | 10201601 | 6/2003 |
| DE | 10230427 | 1/2004 |
| DE | 102004031288 | 1/2006 |
| DE | 102005024046 | 11/2006 |
| DE | 102005054627 | 5/2007 |
| DE | 102005055199 | 5/2007 |
| DE | 102006033062 | 1/2008 |
| DE | 102007040699 | 3/2009 |
| DE | 202009015316 | 2/2010 |
| DE | 102009013323 | 9/2010 |
| DE | 202012100653 | 5/2013 |
| DE | 102012212885 | 7/2013 |
| DE | 102012020999 | 1/2014 |
| DE | 102013111617 | 4/2015 |
| DE | 102014203033 | 8/2015 |
| EP | 0438121 | 7/1991 |
| EP | 1717015 | 11/2006 |
| EP | 2194244 | 6/2010 |
| JP | H05-71409 | 3/1993 |
| JP | H08-291760 | 11/1996 |
| JP | 2005-267420 | 9/2005 |
| JP | 2009-293497 | 12/2009 |
| JP | 2010-112286 | 5/2010 |
| JP | 5906589 | 4/2016 |
| KR | 20020015737 | 3/2002 |
| WO | WO 2015/055582 | 4/2015 |
| WO | WO 2016/016187 | 2/2016 |

OTHER PUBLICATIONS

International Search Report prepared by the European Patent Office dated Aug. 18, 2017, for International Application No. PCT/EP2017/063204.
Official Action with machine English Translation for Japan Patent Application No. 2018-562609, dated Aug. 3, 2020, 10 pages.
U.S. Appl. No. 16/306,038, filed Apr. 29, 2019, Williams.
International Search Report for International Patent Application No. PCT/EP2017/063204, dated Sep. 4, 2017, 3 pages.
Official Action for Austria Patent Application No. A 50499/2016, dated Mar. 3, 2017, 5 pages.
Official Action with English Translation for China Patent Application No. 201780047419.4, dated Dec. 20, 2021, 13 pages.

* cited by examiner

RECIPROCATING PISTON MACHINE AND METHOD AND DEVICE FOR DIAGNOSING AND/OR CONTROLLING A RECIPROCATING PISTON MACHINE

CROSS REFERENCE TO RELATED APPLICATIONS

This application is a national stage application under 35 U.S.C. 371 and claims the benefit of PCT Application No. PCT/EP2017/063204 having an international filing date of 31 May 2017, which designated the United States, which PCT application claimed the benefit of Austria Patent Application No. 50499/2016 filed 31 May 2016, the entire disclosures of each of which are incorporated herein by reference.

The invention relates to a reciprocating piston engine, in particular with a variable compression ratio, which comprises at least a cylinder with a piston and a piston rod which is connected to the piston and to a crankshaft of the reciprocating piston engine. Further, the invention relates to a method and a system for diagnosis and/or control of such a reciprocating piston engine.

Reciprocating piston engines with variable compression ratios are known from the state of the art, whereby in particular, in the present application, as is usual in the technical field, the compression ratio ε is understood to be a ratio of the sum of the (piston) volume $V_H$ and the compression volume or residual volume $V_K$ to the compression volume or residual volume $V_K$, $$\varepsilon = \frac{V_h + V_k}{V_k}.$$

This improves a functionality of the reciprocating piston engine, in particular it can be adapted to different load ranges.

In the state of the art, various different systems for changing the compression ratio in reciprocating piston engines are known, for example from WO 2015/0555582 A2, AT 512334 A1 or DE 10 2012 020999 A1.

In reciprocating piston engines of this type, in particular reciprocating piston internal combustion engines with a variable compression ratio, a diagnosis and/or a control is advantageous in order to be able to determine and to adjust the piston position, in particular with respect to different crank shaft angles and/or the currently set compression ratio.

The publication DE 20 2009 015 316 U1 relates to a device for determining the position of a piston in a cylinder of an internal combustion engine using a light source, a light guide provided between the light source and the combustion chamber, and a light detector for light beams reflected from the piston crown, wherein separate light guides are provided for the light beam to be introduced into the internal combustion engine and for the light beam reflected by the piston crown and to be fed to the light detector, wherein the light guides connect to an image guide which is inserted in a cylinder head of the internal combustion engine with its main radiation direction pointing in the direction of the piston crown.

The publication DE 10 2009 013 323 A1 relates to a method for automatically determining an instantaneous compression ratio of a reciprocating piston engine in operation, which has a variable compression volume, with at least one cylinder in which a piston is guided which is connected to the crankshaft via a piston rod, wherein the piston rod is coupled to a crank of the crankshaft, wherein the method envisages the following steps: a) triggering a signal at a time at which the piston is approximately in the region of the bottom dead center, wherein the crankshaft assumes a defined rotational position, b) synchronously detecting the position of the piston by means of a measurement sensor, and c) determining the compression ratio on the basis of previously known data and determined data.

The publication WO 2016/016187 A1 relates to a method of carrying out an onboard diagnosis in a reciprocating piston internal combustion engine with an adjustable compression ratio at the top dead center (OT), preferably by adjusting the effective length of a piston rod, wherein the onboard diagnosis is used to check the compression ratio of a cylinder.

It is an object of the present invention to improve a reciprocating piston engine or its operation. In particular, it is an object of the invention to be able to better determine and/or adjust the piston position and/or the compression ratio.

This object is solved by a reciprocating piston engine and a method or system according to the independent claims. Advantageous embodiments are the subject of the dependent claims. The teaching of the claims is expressly made part of the description.

In a first aspect of the present invention, a reciprocating piston engine, in particular with a variable compression ratio, comprises at least one cylinder with a piston and a piston rod which is connected to the piston and a crankshaft of the reciprocating piston engine. Preferably the reciprocating piston engine further comprises a first sensor which is arranged in a cylinder wall of the at least one cylinder and which is arranged to detect a relative movement between a piston skirt of the piston and the cylinder wall.

According to a second aspect of the invention, a method of diagnosis and/or control of a reciprocating piston engine, in particular with a variable compression ratio, which comprises at least one cylinder with a piston and a piston rod which is connected to the piston and a crankshaft, comprises the following process steps:
  determining a motion parameter of the piston of the reciprocating piston engine by means of a relative movement between a piston skirt of the piston and a cylinder wall; and
  determining a piston position parameter and/or a piston speed parameter on the basis of the motion parameter.

According to a third aspect of the invention, a system for diagnosis and/or control of a reciprocating piston engine, in particular with a variable compression ratio, which comprises at least one cylinder with a piston and a piston rod which is connected to the piston and to a crankshaft, is arranged to carry out a method in accordance with the invention and/or comprises:
  means for determining a motion parameter of at least one piston of the reciprocating piston engine by means of a relative movement between a piston skirt of the piston and a cylinder wall; and
  means for determining a piston position parameter and/or a piston speed parameter on the basis of the motion parameter.

The invention is based in particular on the approach that a compression ratio of a reciprocating piston engine can be calculated from a movement of the piston, which can be determined by determining various piston positions, or from one or more positions of the piston itself and further information, such as for example the piston speed and/or the respective crank angle present. Further, the invention is based on the knowledge that a position of the piston at one or more points in time can be determined and/or derived or calculated from a movement of the piston skirt relative to the cylinder wall, which can be determined by means of a sensor in the cylinder wall.

In one embodiment, the reciprocating piston engine is a reciprocating piston internal combustion engine, in particular a turbocharged or uncharged two-stroke or four-stroke engine, in particular a petrol engine or a diesel engine, in particular of a motor vehicle, in particular of a passenger car.

In one embodiment, the compression ratio of one or more cylinders, in particular of all cylinders, of the reciprocating piston engine, is adjustable, in particular individually or uniformly, in particular in common, in particular it is reversibly adjustable between a minimum and a maximum compression ratio. In particular, the length of the piston rod can be adjusted in order to change the compression ratio.

The invention makes use of the fact that a piston skirt of the piston sweeps or passes over different locations of the cylinder wall at different times and/or for different lengths of time depending on the length of the piston rod. The distance of the piston skirt from the cylinder wall, or the presence of the piston skirt at certain locations of the cylinder wall, can, however, be reliably determined by a variety of sensors known from the prior art.

A cylinder wall in the sense of the invention is the lateral boundary of the cylinder with which a piston interacts in order to limit a working chamber, in particular a combustion chamber, of a reciprocating piston engine.

A piston in the sense of the invention is the movable component of the reciprocating piston engine which, together with the surrounding housing, in particular the cylinder wall and a cylinder head, forms a closed cavity, the volume of which changes due to the movement of the piston. In particular, a piston comprises a piston crown which is in contact with the one working chamber, a piston skirt which extends along the cylinder wall, and a piston pin with its bearing which piston pin connects the piston to the piston rod.

An inductive sensor in the sense of the invention is a sensor which works according to the induction principle. This requires in particular a coil (winding), a magnet, a constant or a variable magnetic field and possibly a movement.

In an advantageous embodiment of the reciprocating piston engine in accordance with the invention, this has a second sensor, wherein the first sensor is arranged in such a way as to detect the relative movement with respect to a top dead center (OT) of the piston, and the second sensor is arranged in such a way as to detect the relative movement in the region of a bottom dead center (UT) of the piston. The provision of two sensors respectively in the upper and lower regions of the piston makes it possible to determine a possible elasticity in an adjustment device for a variable compression ratio, for example an elasticity of a hydraulically adjustable piston rod.

In a further embodiment of the reciprocating piston engine in accordance with the invention, this has at least a third sensor which is arranged opposite the first sensor with respect to a longitudinal plane of the piston defined by a longitudinal axis of the piston and an axis of the piston pin. Advantageously, the first sensor and the third sensor are arranged in a normal plane to the longitudinal axis of the piston in the region of the top dead center of the piston. These features allow the influence to be taken into account which results from the tilting of the piston. This tilting can be in the range of several tenths of a millimeter and can be caused, for example, by forces occurring during operation which cause a torsion of the crankshaft.

In a further advantageous embodiment of the reciprocating piston engine in accordance with the invention, the piston comprises an electrically conductive and/or ferromagnetic material and the first sensor and/or the second sensor and/or the third sensor is an inductive sensor, in particular an eddy current sensor, or an optical sensor.

In a further advantageous embodiment of the reciprocating piston engine in accordance with the invention, the first sensor and/or the second sensor and/or the third sensor is/are arranged in such a way that the piston skirt completely passes over this/them during the relative movement. If the piston completely passes over the sensor in the cylinder wall during the movement of the piston, the upper and/or lower edge of the piston, i. e. the respective upper and/or lower end of the piston skirt, can be determined very reliably.

In a further advantageous embodiment of the reciprocating piston engine in accordance with the invention, this has a variable compression ratio and the first sensor and/or the third sensor is/are arranged in such a way that the piston skirt completely passes over this/them only at an at least substantially maximum compression ratio and/or the second sensor is arranged in such a way that the piston skirt completely passes over this only at a substantially minimum compression ratio. This arrangement allows the respective maximum displacements of the piston to be determined very reliably, since only when these are reached is the respective sensor not covered by the piston skirt at the top dead center or at the bottom dead center.

In a further advantageous embodiment of the reciprocating piston engine in accordance with the invention, the first sensor and/or the second sensor and/or the third sensor is/are arranged in such a way that piston rings of the piston do not pass over the first sensor and/or the second sensor and/or the third sensor during the relative movement.

The features and advantages explained above in relation to the first aspect of the invention apply in a corresponding manner to the second and third aspects of the invention and vice versa.

In an advantageous embodiment of the method in accordance with the invention, determining a piston position parameter comprises determining a first minimum value of the motion parameter and a second maximum value ($U_{OK}$) of the motion parameter of the movement of the piston. Before the minimum and maximum values are determined, the motion parameter is preferably filtered in order to remove interference, which is for example introduced by the piston rings or by the tilting of the piston, from the course of the parameter. The maximum value and the minimum value then preferably represent absolute minima or maxima in relation to the motion parameter generated at a sensor by the movement of the piston.

In an advantageous embodiment, the method in accordance with the invention further comprises the following process steps:
  detecting a rotational position parameter of a crankshaft of the reciprocating piston engine; and
  determining a crank angle parameter on the basis of the rotational position parameter.

A rotational position parameter in the sense of this advantageous embodiment is preferably determined with an incremental encoder on the crankshaft.

In a corresponding manner, in an advantageous embodiment the system comprises:

means for detecting a rotational position parameter of a crankshaft of the reciprocating piston engine; and
means for determining a crank angle parameter on the basis of the rotational position parameter.

In a further advantageous embodiment, the method in accordance with the invention further comprises one of the following process steps:
determining a compression ratio parameter on the basis of the piston position parameter and/or the piston speed parameter, or
determining a compression ratio parameter on the basis of the piston position parameter and the crank angle parameter.

In a corresponding manner, in an advantageous embodiment the system comprises:
means for determining a compression ratio parameter on the basis of the piston position parameter and/or the piston speed parameter, or
means for determining a compression ratio parameter on the basis of the piston position parameter and the crank angle parameter.

In a further advantageous embodiment of the method in accordance with the invention, the determining of the piston position parameter comprises determining a first value of the motion parameter at a top dead center and/or a second value of the motion parameter at a bottom dead center of the movement of the piston, wherein the method further comprises the following process step:
determining a compression ratio parameter on the basis of the first value and/or the second value and the piston position parameter.

In a corresponding manner, in an advantageous embodiment the system comprises:
means for determining a compression ratio parameter on the basis of the first value and/or the second value and the piston position parameter.

In a further advantageous embodiment, the method in accordance with the invention further comprises the following process steps:
determining a value of a compression ratio on the basis of the first value of the top dead center and/or the first value of the bottom dead center.

The applicable compression ratio of the reciprocating piston engine can immediately be derived from the values of the top dead center and the values of the bottom dead center.

In a corresponding manner, in an advantageous embodiment the system comprises:
means for determining a compression ratio parameter on the basis of the first value and/or the second value and the piston position parameter.

The tilting of the piston at the top dead center can also be taken into account, which tilting can be determined, according to a variant of the invention, by determining piston position parameters on opposite sides of the piston, in particular on sides of the piston which are opposite with respect to the piston pin axis.

In a further advantageous embodiment of the method in accordance with the invention, the determining of a piston position parameter further comprises the following process steps:
adjusting a target compression ratio of at least a first cylinder of the reciprocating piston engine from a first value, in particular an extreme value, to a second value, in particular an extreme value;
determining a first value of the piston position parameter and/or a first value of the crank angle parameter for the first value of the target compression ratio; and
determining a second value of the piston position parameter and/or a second value of the crank angle parameter for the second value of the target compression ratio,
wherein the determining of a value of the compression ratio parameter is carried out on the basis of the first and second values of the piston position parameter and/or the crank angle parameter.

In a corresponding manner, in an advantageous embodiment the system comprises:
means for adjusting a target compression ratio of at least a first cylinder of the reciprocating piston engine from a first value, in particular an extreme value, to a second value, in particular an extreme value;
means for determining a first value of the piston position parameter and/or a first value of the crank angle parameter for the first value of the target compression ratio; and
means for determining a second value of the piston position parameter and/or a second value of the crank angle parameter for the second value of the target compression ratio.

In a further advantageous embodiment of the method in accordance with the invention, the adjusting of a target compression ratio comprises the process step of:
changing a target length of a piston rod of the at least one first cylinder of the reciprocating piston engine.

In a corresponding manner, in an advantageous embodiment the system comprises:
means for changing a target length of a piston rod of the at least one first cylinder of the reciprocating piston engine.

In a further advantageous embodiment, the method in accordance with the invention further comprises the following process steps:
detecting an inductive and/or an optical signal which is influenced by the relative movement between the piston skirt of the piston and the cylinder wall; and
determining the motion parameter on the basis of the inductive and/or the optical signal.

In particular, inductive and/or optical signals are particularly well suited in order to determine the relative movement of the piston skirt relative to the cylinder wall.

In a corresponding manner, in an advantageous embodiment the system comprises:
means for detecting an inductive and/or an optical signal which is influenced by the relative movement between the piston skirt of the piston and the cylinder wall; and
means for determining the motion parameter on the basis of the inductive and/or optical signal.

In a further advantageous embodiment of the method in accordance with the invention, a value of the motion parameter depends on the distance, in particular the shortest distance, of the piston skirt from a measuring point or on a speed of the relative motion.

In a further advantageous embodiment of the method in accordance with the invention, the motion parameter is an electric voltage which is generated by the inductive and/or the optical signal.

In a further advantageous embodiment of the method in accordance with the invention, the inductive and/or the optical signal is influenced in particular by means of the lower end and/or the upper end of the piston skirt.

In a further advantageous embodiment of the method in accordance with the invention, the speed parameter additionally takes into account a distance of the piston from the cylinder wall at a respective measurement time. If the speed of the piston is determined by an induction in the inductive sensor through a piston movement, the shape of the piston skirt and the distance of the piston skirt from the cylinder wall should be taken into account at the same time in order to be able to calculate the exact speed values.

In a further advantageous embodiment of the method in accordance with the invention, the piston position parameter is determined by evaluation of a course of the motion parameter as a function of time, in particular by evaluation of edges of the course. In particular, such a course shows at what time and how often a piston skirt has moved over the sensor.

In a further advantageous embodiment of the method in accordance with the invention, the inductive and/or optical signal which has been detected is filtered and the motion parameter is determined on the basis of the filtered inductive and/or optical signal.

In a further advantageous embodiment of the method in accordance with the invention, the motion parameter is determined exclusively for at least one predetermined crank angle range.

In a further advantageous embodiment of the method in accordance with the invention, the at least one predetermined crank angle range comprises a top dead center and/or a bottom dead center of at least one cylinder of the reciprocating piston engine, in particular of the first cylinder of the reciprocating piston engine, and/or extends over at least 2° and/or over at most 135°. In addition or alternatively, in an embodiment, an or the predetermined crank angle range, in particular each predetermined crank angle range, extends over at least 2°, in particular over at least 5°, in particular over at least 10°, and/or at most 135°, in particular at most 90°, in particular at most 45°.

In a further advantageous embodiment of the method in accordance with the invention, the motion parameter is determined on the basis of at least one mean value and/or at least one extreme value.

In a further advantageous embodiment of the method in accordance with the invention, a signal, in particular a diagnostic and/or a control signal, is output on the basis of the motion parameter, in particular if the motion parameter satisfies a predetermined condition, in particular if it exceeds a predetermined upper threshold value and/or falls below a predetermined lower threshold value and/or lies outside a predetermined range. In this way it is possible to react advantageously to the detection of an incorrect compression ratio.

In a further advantageous embodiment of the method in accordance with the invention, the first and/or the second motion parameter is/are determined on the basis of, or in dependence upon, at least one difference between two mean values and/or extreme values, in particular maximum values and/or minimum values, of the movement and can in particular indicate this.

A means in the sense of the present invention may be constructed in terms of hardware and/or software, in particular comprising a processing unit, in particular a digital processing unit, in particular a microprocessor unit (CPU), preferably connected in terms of data or signals to a memory and/or a bus system, and/or may comprise one or more programs or program modules. The CPU may be constructed so as to process instructions which are implemented as a program stored in a memory system, to acquire input signals from a data bus and/or to output output signals to a data bus. A storage system may comprise one or more storage media, in particular different storage media, in particular optical, magnetic, solid state and/or other non-volatile media. The program may be such that it embodies, or is capable of executing, the methods described herein, so that the CPU is able to execute the steps of such methods and thus to control and/or monitor in particular a reciprocating piston engine.

In the present application, the term 'control' is in particular also understood to encompass the output of control signals on the basis of a comparison with detected actual values, i. e. control with feedback.

In an advantageous embodiment of the method in accordance with the invention, one or more, in particular all, process steps of the method are carried out completely or partially automatically, in particular by the system or its means.

Further advantageous developments of the present invention become clear from the following description of preferred example embodiments. The figures show, at least partially schematically:

FIG. 1 shows a portion of a motor vehicle with a reciprocating piston internal combustion engine 1 with a variable compression ratio and a system for diagnosis of the reciprocating engine 1 according to an embodiment of the present invention.

Figure 1:
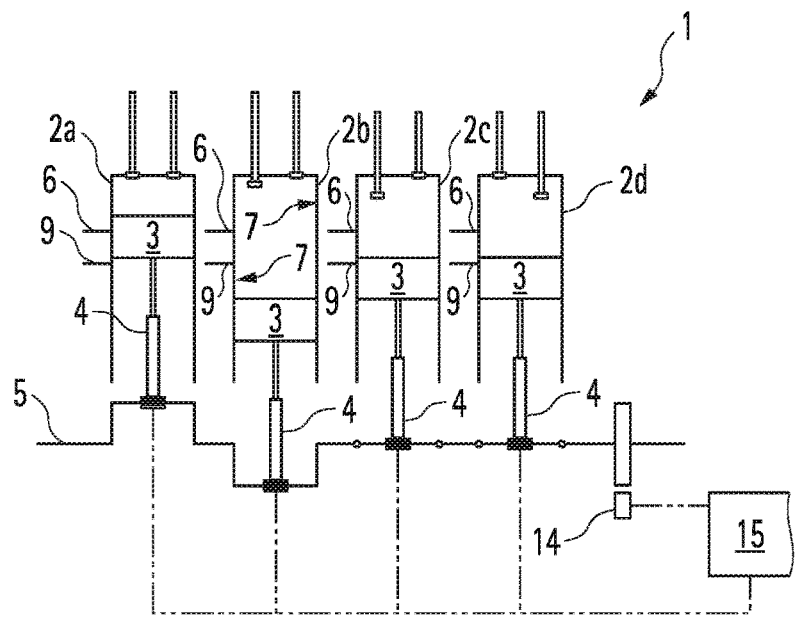
FIG. 1 shows a first cross-section of a first example embodiment of a reciprocating piston engine according to the first aspect of the invention.

The reciprocating piston engine 1 has a crankshaft 5 and several cylinders 2a, 2b, 2c, 2d in a manner known per se, in which pistons alternately compress a fuel-air mixture (cf. cylinder 2a), are driven by combustion of the mixture (cf. cylinder 2b), draw in (cf. cylinder 2c) and exhaust (cf.

cylinder 2d) air or mixture and are coupled to the crankshaft 5 via piston rods 4 for this purpose.

The length of the piston rods 4 and thus the compression ratio of the cylinders 2a, 2b, 2c, 2d or of the reciprocating piston internal combustion engine 1 can be adjusted by means of an engine ECU 15, as indicated by a dash-dotted line in FIG. 1.

By means of a trigger wheel 14, the ECU 15 detects a rotational position of the crankshaft 5 as a rotational position parameter and determines from this, in particular, values of a crank angle parameter γ, for example $\gamma_{1,1}$, $\gamma_{2,1}$, $\gamma_{3,1}$, $\gamma_{4,1}$.

Figure 2:
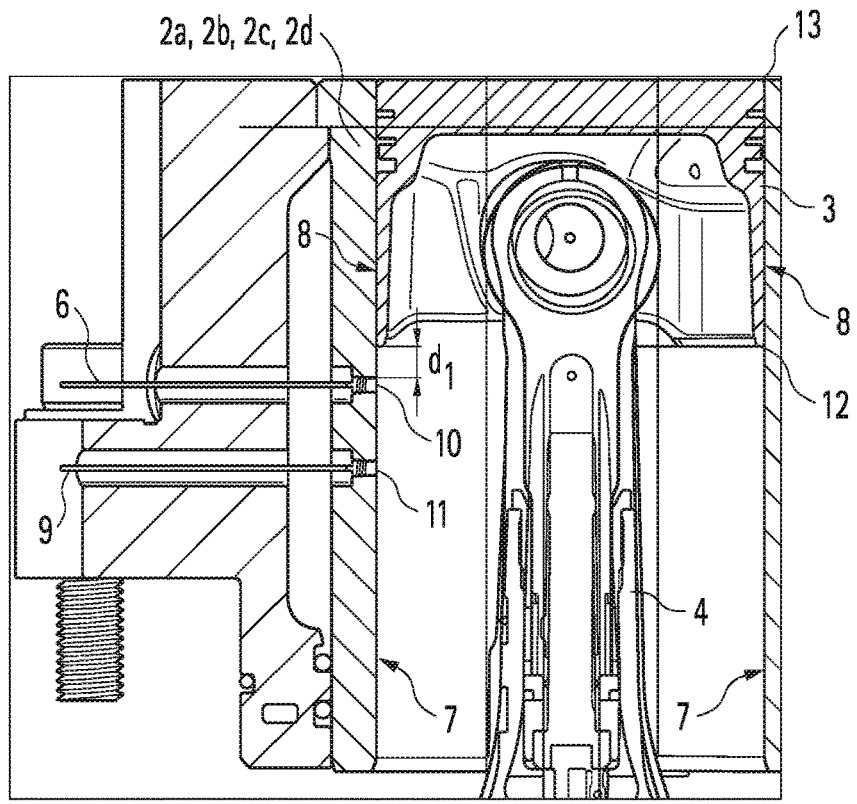
FIG. 2 shows an enlarged section of the area around a piston of the first example embodiment of a reciprocating piston engine in accordance with the invention according to FIG. 1.

FIG. 2 shows one of the cylinders 2a, 2b, 2c, 2d of the reciprocating piston internal combustion engine 1 according to FIG. 1 at the top dead center OT, at which the piston 3 is in the closest possible position to the cylinder head. The combustion chamber (not shown) at the cylinder head is limited towards the bottom by the upper side of the piston 3 and by the cylinder walls 7. The piston skirt 8 is used to guide the piston 3 in the cylinder 2a, 2b, 2c, 2d and interacts with the cylinder wall 7, which is cylindrical in the illustrated example embodiment. Sealing rings are also arranged in the area of the piston skirt 8, which seal a remaining gap between the piston skirt 8 and the cylinder wall 7.

Openings or measuring points 10, 11 are formed in the cylinder wall 7, in particular perpendicular to the main axis of the cylinder 2a, 2b, 2c, 2d. By means of these openings 10, 11, at least one sensor, in the example embodiment shown a first sensor 6 and a second sensor 9, can determine whether the piston skirt 8 is located at the level of the first sensor 6 and/or the second sensor 9 and preferably also whether the piston 3 is located in the vicinity of these sensors 6, 9.

Sensors 6, 9 are preferably inductive sensors, in particular eddy current sensors, in whose magnetic field the piston 3, which comprises or consists of an electrically conductive and/or a ferromagnetic material, causes a change depending on the distance from the sensors 6, 9.

In FIG. 2, the lower edge 12 of the piston skirt 8 is located at a distance d1 from the upper, first sensor 6. Here, the magnetic field of the first eddy current sensor 6 is preferably no longer influenced by the piston 3.

The change in the field of the sensors 6, 9 resulting from a movement of the piston 3 can be output as voltage signal U, for example. Such a voltage signal can then be used as a motion parameter in the sense of the invention.

If, during a rotation of the crankshaft 5 by the action of the piston rod 4, the piston 3 moves into the position of the bottom dead center, as it is referred to, i. e. the position of the piston 3 at the maximum distance from the cylinder head (not shown), the piston 3 or the upper edge 13 of the piston 3 would also be spaced, at a distance d2, from the second eddy current sensor 9 or the associated opening 11 in the cylinder wall 7 in the example embodiment shown. Also in this position the piston 3 preferably no longer has any influence on the field of the second eddy current sensor 9.

Figure 3:
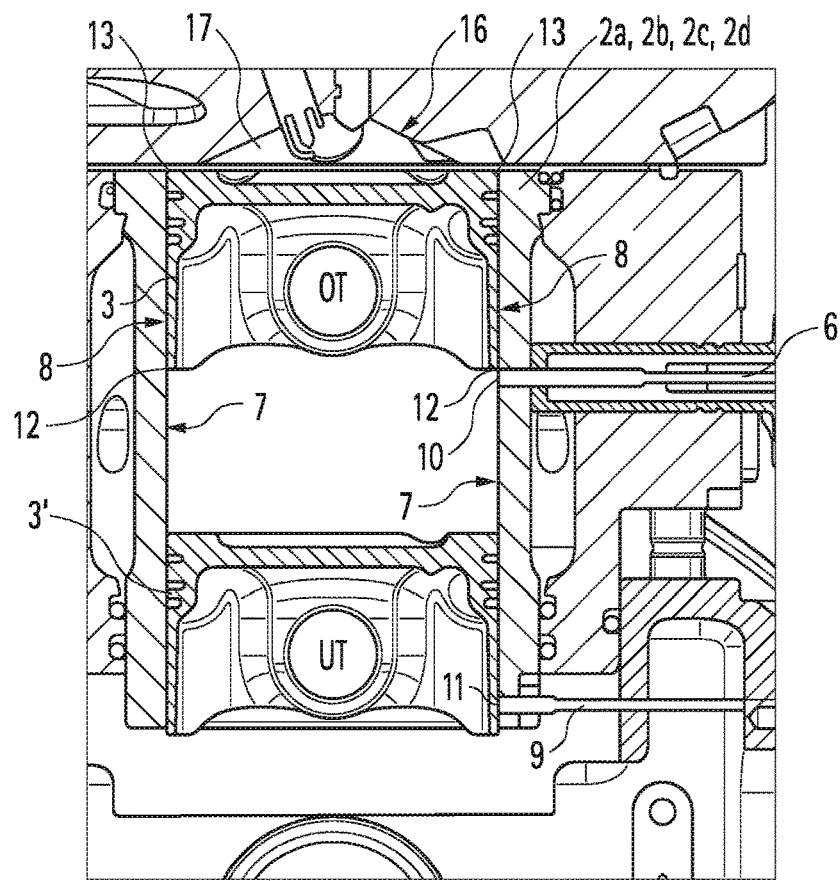
FIG. 3 shows an enlarged section around a cylinder of a second example embodiment of a reciprocating piston engine in accordance with the invention.

FIG. 3 shows a further, second example embodiment of a reciprocating piston internal combustion engine 1 in accordance with the invention. Here, the piston 3 is shown both at the top dead center OT, as well as at the bottom dead center UT, as piston 3'. FIG. 3 additionally shows cylinder head 16, which, together with the piston 3, bounds a combustion chamber 17.

In contrast to the example embodiment in FIG. 2, in the example embodiment shown here the first eddy current sensor 6 is arranged in such a way that, at the top dead center OT, the lower edge 12 of the piston 3 just no longer covers the first eddy current sensor 6 or the associated opening in the cylinder wall 7.

Further, in contrast to FIG. 2, the lower eddy current sensor 9 is arranged in such a way that it or the associated opening in the piston wall 7 is covered by the piston 3' at the bottom dead center.

Figure 4:
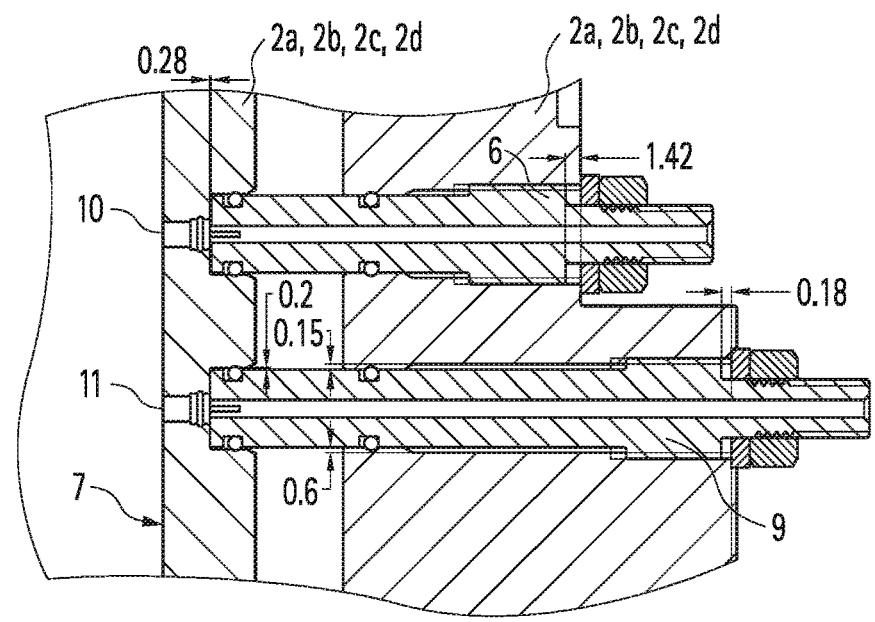
FIG. 4 shows an enlarged section in the area around sensors of a reciprocating piston engine in accordance with the invention according to FIGS. 1 and 2.

FIG. 4 shows, by way of example, how the first eddy current sensor 6 and the second eddy current sensor 9 are arranged in a cylinder 2a, 2b, 2c, 2d. In particular, the sensors 6, 9 are sealed, by means of seals, against the interior of the cylinder towards the cylinder wall 7, as well as against a cooling duct.

Figure 10:
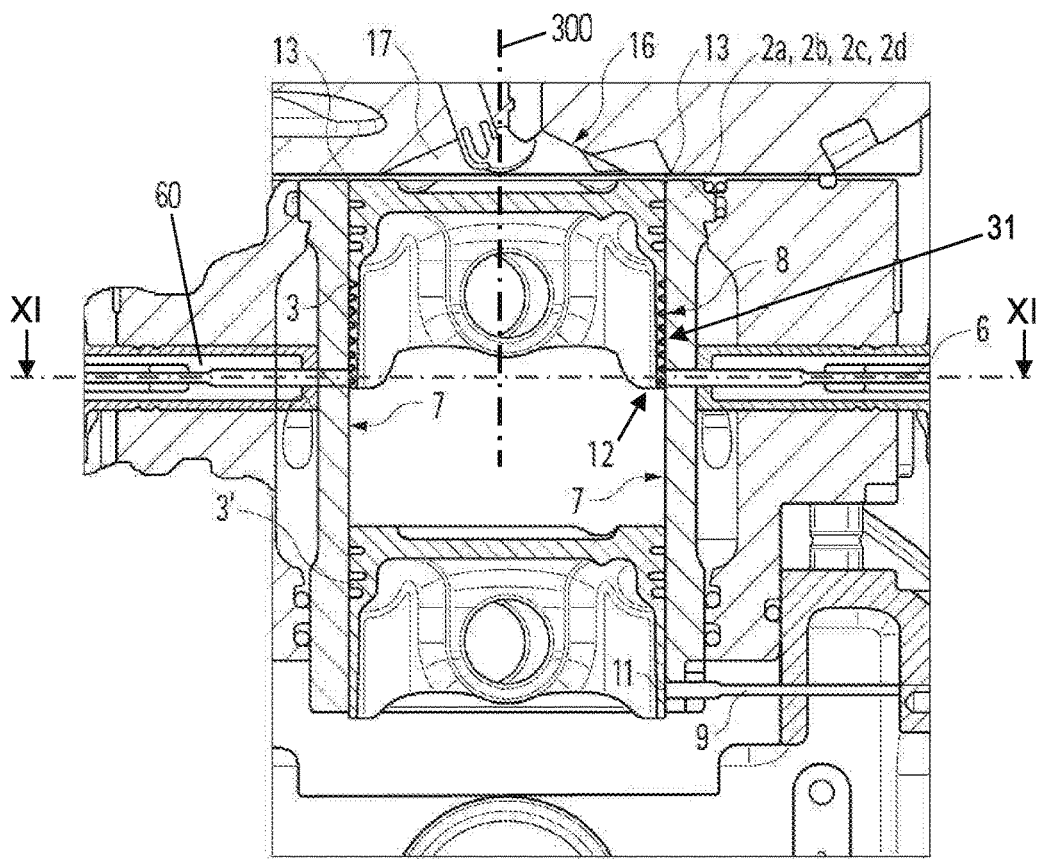
FIG. 10 shows an enlarged section around a cylinder of a third example embodiment of a reciprocating piston engine in accordance with the invention in a sectional view along line X-X in FIG. 11.

FIG. 10 shows a further, third example embodiment of a reciprocating piston internal combustion engine 1 in accordance with the invention. Elements which have already been explained in FIG. 3 are provided here with the same reference signs and will not be discussed further.

The piston 3 is shown both at the top dead center and, as piston 3', at the bottom dead center. FIG. 10 additionally shows the cylinder head 16, which, together with the piston 3, bounds a combustion chamber 17. A piston longitudinal axis 300 is shown for the piston 3 at the top dead center, which runs predominantly parallel to a main axis of the cylinder during operation. The slightly offset representation of the piston longitudinal axis 300 results from the sectional view selected in FIG. 10, which runs diagonally to the piston pin axis 30 (see FIG. 11).

In contrast to previous example embodiments, a third sensor 60 is provided in addition to the first 6 and second sensor 9 in the example embodiment shown here, whereby the sensors 6, 9, 60 are constructed as eddy current sensors, for example. The third sensor 60, together with the first sensor 6, is arranged in a normal plane to the piston longitudinal axis 300. This normal plane is placed as close as possible to the top dead center of the piston 3 in the direction of the main axis of the cylinder. The first 6 and third sensors 60 are arranged in such a way that, at the top dead center, the lower edge 12 of the piston 3 or of the piston skirt 8 covers the first 6 and third sensors 60 or the corresponding openings in the cylinder wall 7.

The positioning of the second sensor 9 is chosen to be the same as in the other example embodiments.

Figure 11:
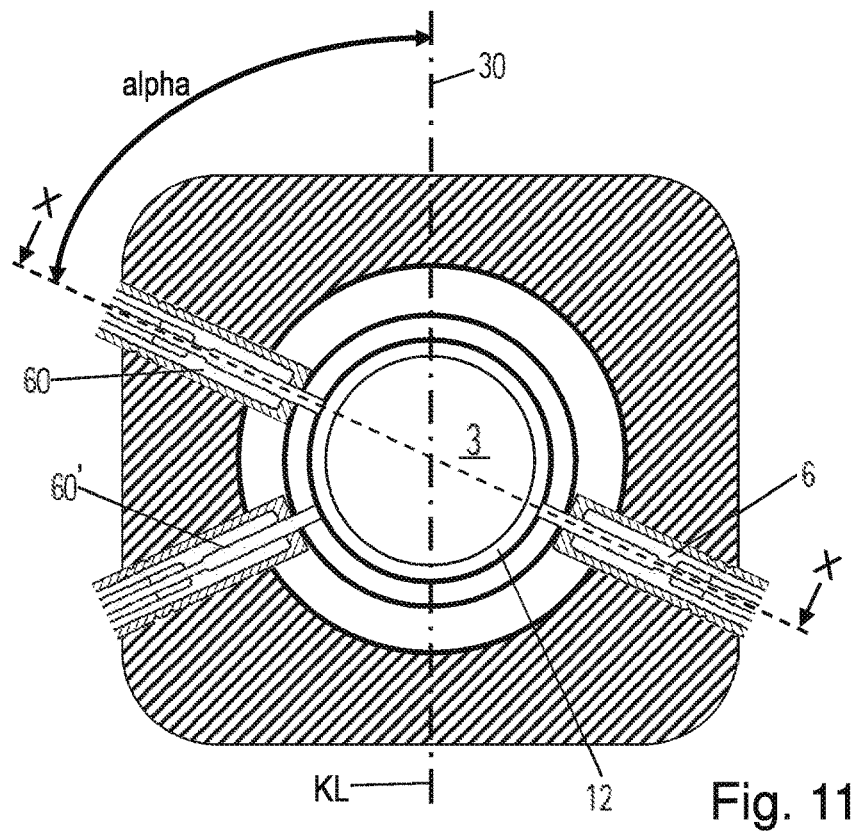
FIG. 11 shows a sectional view of the third example embodiment of FIG. 10 along line XI-XI in FIG. 10.

As can be seen from the sectional view in FIG. 11, the first 6 and third sensors 60 are arranged on opposite sides of a piston longitudinal plane KL, which is defined by the piston longitudinal axis 300 and the piston pin axis 30. In FIG. 11, the piston longitudinal plane KL runs perpendicular to the image plane and coincides with the piston pin axis 30 in the illustration.

FIG. 11 shows two variants for the arrangement of a third sensor 60: In a first variant, the first sensor 6 and the third sensor 60 are arranged opposite each other with respect to the piston longitudinal axis 300. The sensor longitudinal axes coincide with each other and run through the piston longitudinal axis 300. The angle alpha between the sensor longitudinal axes and the piston pin axis 30 is 65° for example but can also be chosen to be different depending on the available space, as long as the first 6 and third sensors 60 are located on different sides of the piston longitudinal plane KL.

In a second variant, the first 6 and third sensors 60' are arranged as a mirror image with respect to the longitudinal plane KL of the piston. The longitudinal axes of the sensors intersect in the piston longitudinal axis 300. Although two third sensors 60, 60' are arranged in FIG. 11, it is possible to implement only one of the variants, whereby example embodiments with two third sensors 60, 60' are also possible.

The third example embodiment additional enables the piston tilting to be taken into account for the determination of the parameters required for the method, e.g. the piston position parameter. Through a comparison of the measurement values of the third sensor 60 with that of the first sensor 6, such influences, i. e. movements of the piston 3 in the direction of the sensor longitudinal axes, which indicate a tilting, can be determined and taken into account.

In order to be able to improve the accuracy of the results of this example embodiment, grooves 31 can additionally be formed in the piston 3 or in the piston skirt 8, which allow a clear position determination. The grooves 31 are formed in that area of the piston skirt 8 which is moved past one or more sensors during operation of the reciprocating piston internal combustion engine. In order for the tilting described above to be able to be detected, the grooves 31 are advantageously formed in those areas of the piston skirt 8 which are moved past the first sensor 6 and the third sensor 60, 60'. The grooves 31 are formed starting from the lower edge 12 of the piston 3 upwards, i. e. in the direction of the combustion chamber 17. The signals generated in the sensors 6, 60. 9 during the passage of the grooves 31 can be used additionally or instead of the signals of the piston rings which have already been described.

Figure 12:
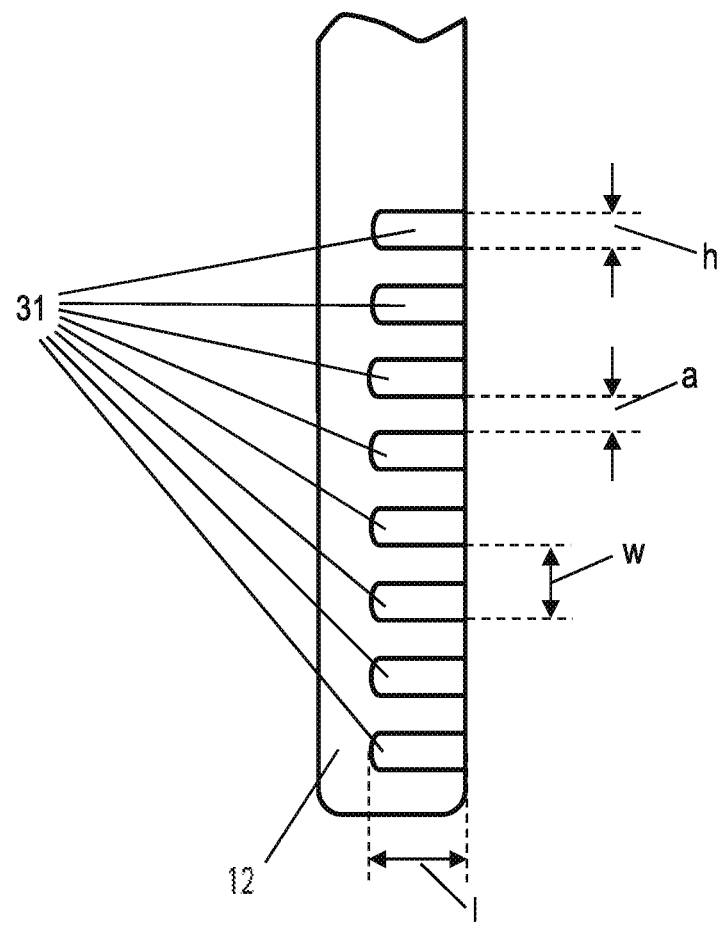
FIG. 12 shows a detail of a piston of the third example embodiment of a reciprocating piston engine in accordance with the invention.

FIG. 12 shows a portion of the piston skirt 8 of the piston 3 of the third example embodiment. The grooves 31 can be seen here, whereby the provision of eight grooves 31 as shown is only by way of example, and a different number can also be chosen. Depending on the application, the height h of a groove 31 and the groove spacing a between adjacent grooves 31 can be chosen differently. The smaller the height h of the groove 31 is selected, the higher the resolution of the signal of the associated sensor. In the example embodiment shown, the height h and the groove spacing a are chosen to be the same for all grooves 31; the "pitch" w, as it is referred to, is thus 2*h.

The length l of the groove 31, i. e. the extent in the circumferential direction of the piston 3, can, for example, be chosen in such a way that it corresponds to the diameter of the respective associated sensor 6, 60. This enables a particularly reliable measurement.

A system in accordance with the invention for diagnosis and/or control of a reciprocating piston internal combustion engine 1 is preferably formed by the first eddy current sensor 6, as well as, if present, by the second eddy current sensor 9 and/or a third sensor or eddy current sensor 60, 60' and a control or evaluation unit 15. Furthermore, such a system preferably also comprises a device 14 for determining the crank angle γ, in particular an encoder wheel/trigger wheel or an incremental encoder.

Such a system is generally suitable for the determination of the piston positions. On the one hand it can be determined whether the piston 3 is in the area of the first eddy current sensor 6 and/or the second eddy current sensor 9 ($U_{MK}$) or whether it is outside the area of the eddy current sensors 6, 9 ($U_{OK}$). If the field of the first eddy current sensor 6 and/or of the second eddy current sensor 9 further exhibits a spherical characteristic, the piston 3 can also still be detected at a certain distance $d_{max}$ by the respective eddy current sensor 6, 9, whereby the signal strength depends on the distance d, and in particular it is proportional to the distance. The tilting of the piston 3 can also be determined and taken into account by the sensors, in particular by a first eddy current sensor 6 and at least a second eddy current sensor 60, 60'. In addition, in those positions of the piston 3 in which none of the eddy current sensors 6, 9 can detect the piston 3, the piston position can take place by determining a piston position parameter $U_{MK}$, $U_{OK}$ and a piston speed parameter U̇ as well as a subsequent interpolation on the basis of the speed U̇. For example, the speed can be determined from the passing of the upper edge 12 and the lower edge 13 at the eddy current sensors 6, 9. Further, a determination of the speed U̇ can be determined via a strength of the field induced or changed by the piston 3 at the eddy current sensors 6, 9.

In addition, the piston skirt 8 is preferably not completely parallel to the cylinder wall 7, but has different distances from the cylinder wall 7 over its extent. Depending on the distance between a portion of the piston skirt 8 covering the eddy current sensors 6, 9 and the eddy current sensors 6, 9, the field of the eddy current sensors 6, 9 is influenced to a varying degree. These values of the influence of the respective field also allow a statement to be made regarding the piston position because the piston position is reflected in a corresponding value of the piston position parameter $U_{MK}$, $U_{OK}$.

In particular, however, the method 100 in accordance with the invention and the system in accordance with the invention are also suitable for onboard diagnostics, as they are referred to, or for the control of a reciprocating piston internal combustion engine 1 with variable compression ratio ε. The system and method in accordance with the invention allow conclusions to be drawn as regards the applicable compression ratios ε in each case.

The variable compression ratio can be achieved, in particular, by changing the piston rod length, wherein a simplified distinction is made between the extended piston rod (index a) and the retracted piston rod (index e) in relation to the example embodiments.

In the present description, for the sake of a simplified representation, the piston position parameter is represented as a digital value with the values $U_{MK}$, i. e. with the piston at the level of a respective eddy current sensor 6, 9, or $U_{OK}$, i. e. without piston at the level of the eddy current sensor 6, 9. As can be seen from the preceding description and also from the diagrams shown below with courses of the motion parameter U of the piston 3, further values of the piston position parameter can also be defined as a function of the motion parameter U, which can then each be assigned to a specific position of the piston 3.

Figure 5:
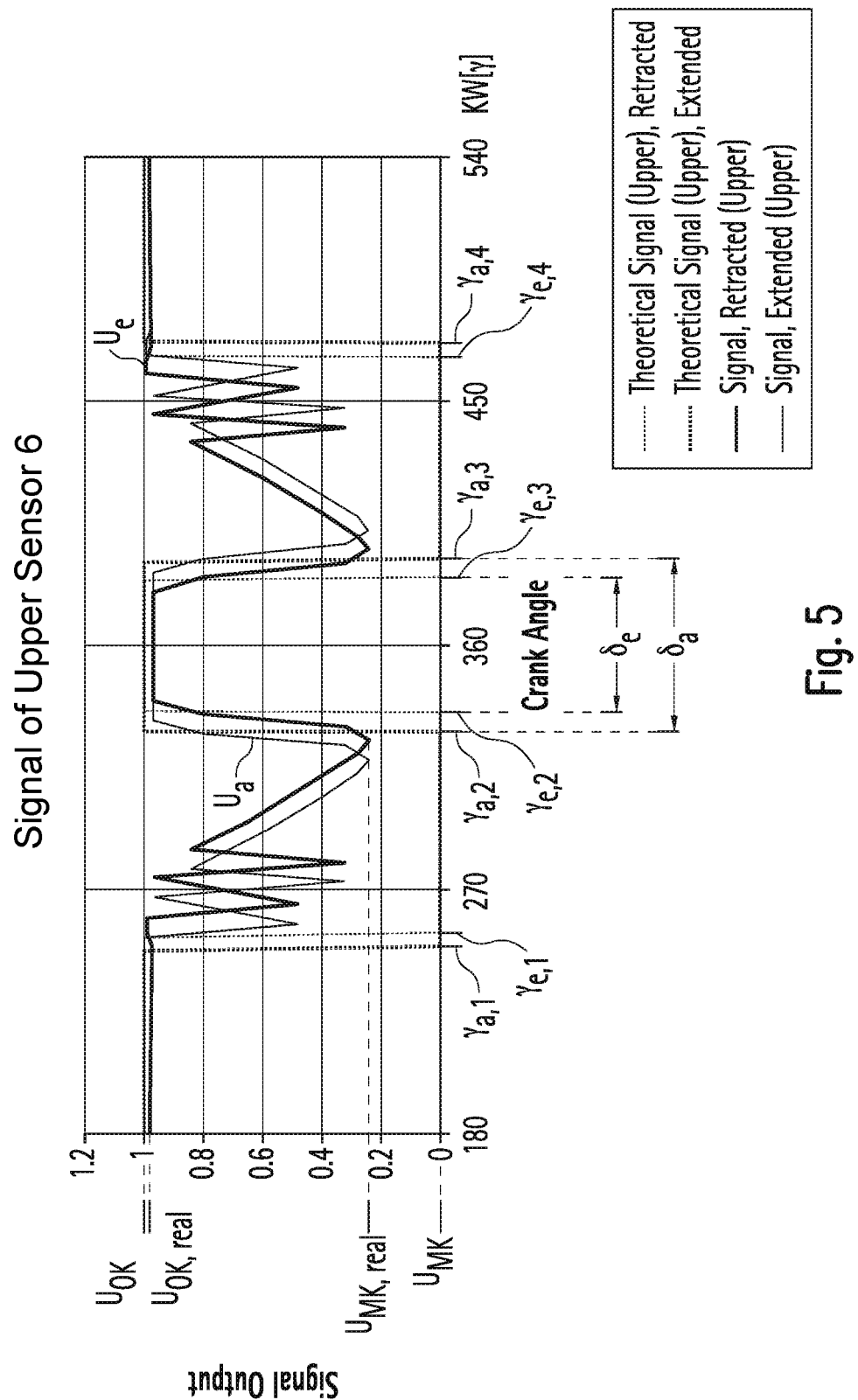
FIG. 5 shows a diagram of a course of an output parameter of an upper sensor of the first example embodiment of the reciprocating piston engine in accordance with the invention according to FIGS. 1 and 2.

FIG. 5 shows a diagram with courses of voltage signals $U_a$ and $U_e$, which represent a motion parameter of the piston 3 of a reciprocating piston engine 1 according to the first example embodiment of FIGS. 1 and 2.

The method in accordance with the invention will be explained in the following with reference to the diagrams of FIGS. 5 to 8 as well as the flow diagram of FIG. 9.

First, an inductive or, if applicable, also an optical signal, is detected which is triggered or influenced by the relative movement between the piston skirt 8 of the piston 3 and the cylinder wall 7. In particular, this signal is numerically filtered and a motion parameter U is determined therefrom 101. A motion parameter for a piston rod 4 in the extended state is designated $U_a$ in FIGS. 5 and 6, whereas a motion parameter for a piston rod in the retracted state is designated $U_e$ here.

The motion parameter U based on the signal generated by the first eddy current sensor 6 and/or the second eddy current sensor 9 and/or a third eddy current sensor 60. 60', which is indicated in the diagram by a voltage, increases with increasing distance d of the piston 3 from the respective sensor 9. The lowest voltage value of the motion parameter is therefore generated when the piston 3 is in the position in which the piston skirt 8 is closest to the respective sensor 6, 9.

The courses of the motion parameters $U_a$, $U_e$ shown in FIG. 5 each indicate parameters derived from the actual measurement signals. The square courses respectively associated with the two courses $U_a$, $U_e$ indicate a theoretical, ideal course of the motion parameter, respectively in the extended state and the retracted state. In a corresponding manner, $U_{OK}$ indicates the value of the motion parameter, when the piston 3 is not within the range of the first eddy current sensor 6, and $U_{OK,real}$ the corresponding real value of the motion parameter derived from the measurement signal. In a corresponding manner, the motion parameter value $U_{MK}$ or $U_{MK,real}$ respectively indicates the theoretical and the actual motion parameter value when the piston is within the range of the first eddy current sensor 6. It can be appreciated from the motion parameters $U_a$, $U_e$ that the piston 3 enters into the range $d_{max}$ of the first eddy current sensor 6 at a crank angle γ of about 250° and the motion parameter therefore no longer has the value $U_{OK,real}$. The subsequent spikes a crank angle γ of about 270° represent signal interference which is caused by the piston rings at the upper end of piston 3. Comparable interference results from the grooves 31, which can be provided in the piston skirt 8 according to the third example embodiment in FIGS. 10 to 12.

The closest distance d between the piston skirt 8 and the first eddy current sensor 6 can be seen at a crank angle of about γ=310°, which completes the motion parameter value $U_{MK,real}$. Shortly afterwards, the lower edge 12 of the piston skirt 8 passes over the first sensor 6 and the motion parameter $U_a$ rises again to the value $U_{OK,real}$, i. e. the piston skirt 8 is no longer within the range $d_{max}$ of the first eddy current sensor 6. At a crank angle of γ=360°, the piston 3 reaches the position as shown in FIG. 2. After that the piston 3 moves downwards again and first sweeps over the first sensor 6 with the lower edge 12 of the piston skirt 8, whereupon the motion parameter $U_a$ again drops to the value $U_{MK,real}$ and then displays an increase of the motion parameter value $U_a$ as a mirror image of the upward movement of the piston 3 which has been described above, until the piston wedge rings again initiate an interference of the measurement signal and then the upper edge 13 of the side 8 of the piston again sweeps over the upper sensor 6, whereupon the motion parameter value remains at $U_{OK,real}$.

A course with a corresponding characteristic also results for the motion parameter $U_e$ for the retracted piston rod.

As can be seen from FIG. 5, for the motion parameter $U_e$, the respective points in time are different from the values for the motion parameter $U_a$, in particular with regard to the crank angle γ, at which the piston skirt 8 sweeps over the first eddy current sensor 6. This results from the fact that the first sensor 6 is reached later when the piston rod is shortened and the piston 3 moves upwards, but in a corresponding manner is reached earlier when the piston 3 moves downwards. The corresponding values $U_{OK}$, $U_{MK}$ are evaluated as piston position parameters, i. e. as characteristic values for the determination of the piston position in relation to the sensors 6, 9, as well as the absolute piston position 102.

The characteristic values of a crank angle parameter 103-2, which is derived in particular from the rotational position of the crankshaft 103-1, are each shown on the ordinate of FIG. 5.

In particular, $γ_{x,2}$ is the respective crank angle parameter value at which the lower edge 12 of the piston skirt 8 sweeps over the first eddy current sensor 6 in the upward movement of the piston 3 and $γ_{x,3}$ is the respective crank angle parameter value at which the lower edge 12 of the piston skirt 8 again sweeps over the upper sensor 6 in the downward movement of the piston 3. From these two crank angle parameter values, a compression ratio parameter value $δ_a$ and $δ_e$ can respectively be determined 104b in the extended state and in the retracted state.

As an alternative to the crank angle γ, the respective compression ratio parameter can be determined by means of the piston position parameter U and a piston speed parameter U̇ derived from this parameter 104a. What is used here is the fact that with a known length of the piston skirt 8 and a known speed of the piston 3 during the upward and downward movement, as well as the time duration between a first sweep over the first eddy current sensor 6 during the upward movement of the piston 3 and a second sweep over the first eddy current sensor 6 during a downward movement of the piston 3, it is possible to determine how far the piston 3 has moved upwards towards the cylinder head. In addition, the possible tilting of the piston 3, which can compromise the piston position, can be determined and filtered out by the provision of a third eddy current sensor 60, 60'.

Figure 6:
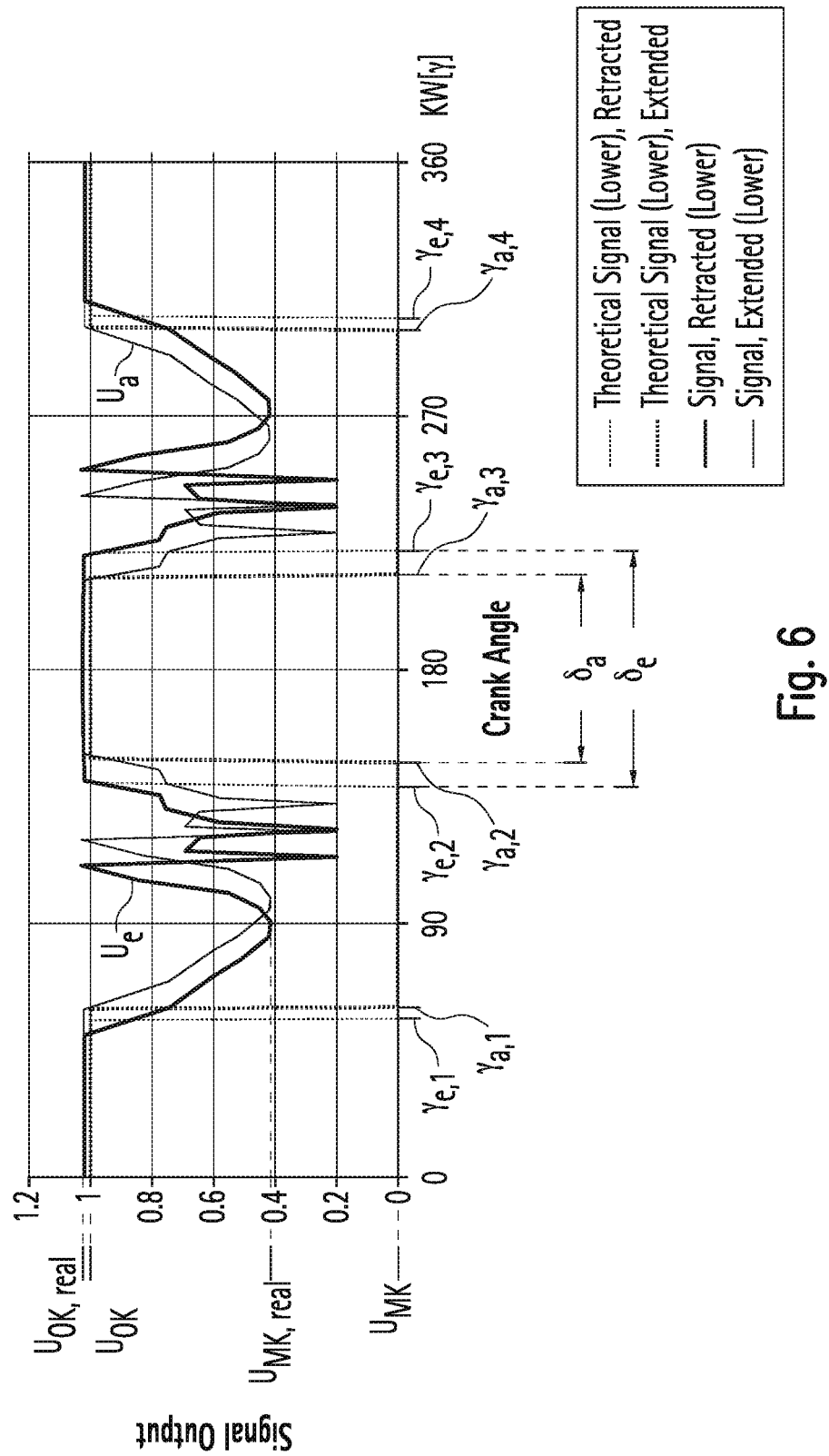
FIG. 6 shows a diagram of a course of an output parameter of a lower sensor of the first example embodiment of the reciprocating piston engine in accordance with the invention according to FIGS. 1 and 2.

The diagram according to FIG. 6 shows the course of a motion parameter for an extended piston rod $U_a$ and a retracted piston rod $U_e$ at two lower, second eddy current sensors 9 according to the first example embodiment of FIGS. 1 and 2.

The piston position parameter and its parameter values as well as the crank angle parameter can be determined according to FIG. 5. Since the piston 3 moves further away from the second sensor 9 during the downward movement of the piston 3 when the piston rod 4 is retracted than when the piston rod 4 is extended, the compression ratio parameter value $δ_e$ is greater than the corresponding compression ratio parameter $δ_a$ when the piston rod 4 is extended.

Figure 7:
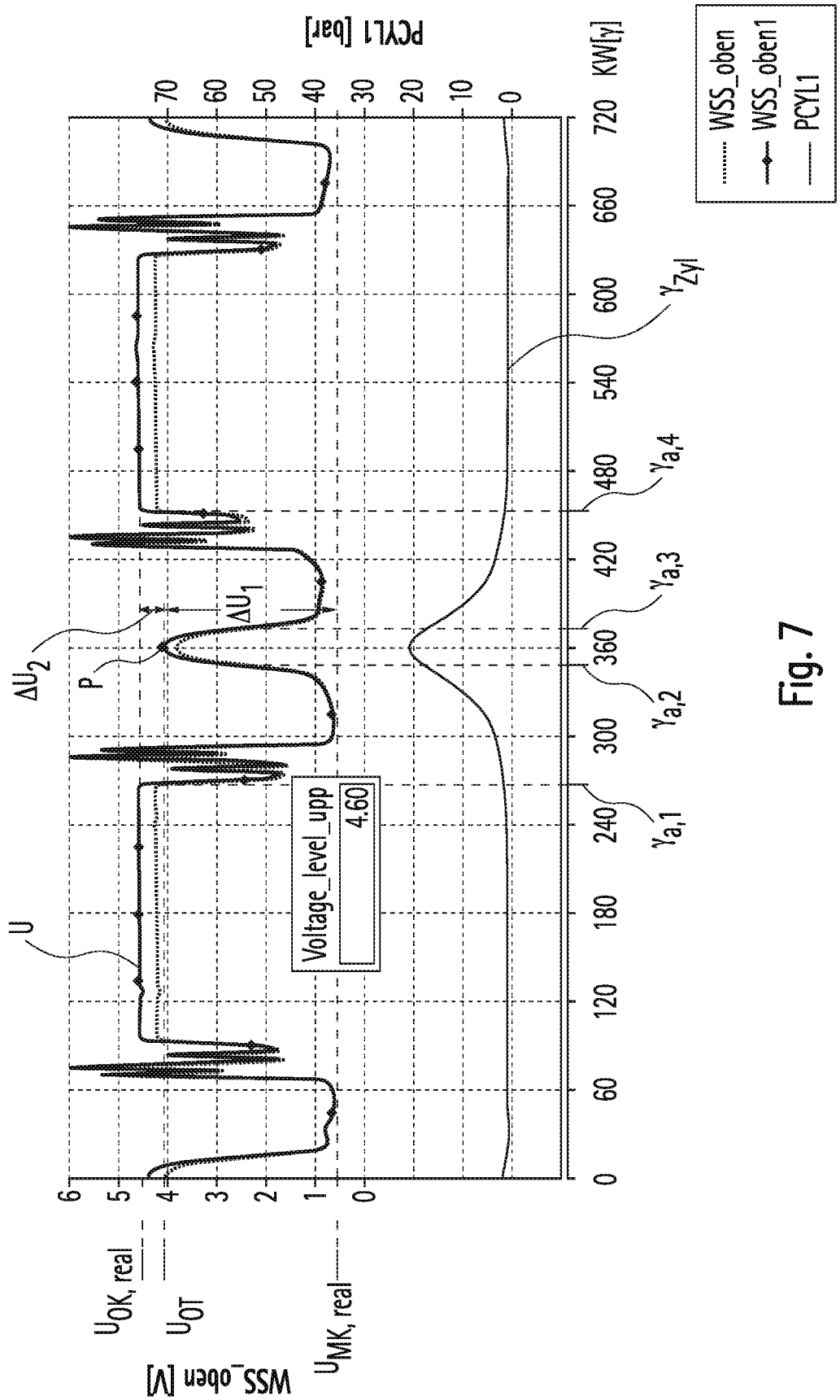
FIG. 7 shows a diagram of a course of an output parameter of an upper sensor of the second example embodiment of a reciprocating piston engine in accordance with the invention according to FIG. 3.

FIG. 7 shows the course of the motion parameter U at the upper, first eddy current sensor 6 of the second example embodiment of a reciprocating piston internal combustion engine 1 in accordance with the invention according to FIG. 3. Again, the course of the motion parameter U, as in FIG. 5, indicates the change of a field signal at the upper, first eddy current sensor 6. Also in FIG. 7, the motion parameter value drops abruptly, here too the characteristic interference signals of the piston rings appear thereafter while the piston 3 passes over the first eddy current sensor 6. Thereafter the motion parameter U drops and reaches the piston position parameter value $U_{MK,real}$, which indicates that the piston skirt 8 completely covers the first eddy current sensor 6. At a crank angle $γ_{a,2}$ of about 340°, the motion parameter U increases, which indicates that the piston 3 or the piston skirt 8 has completely passed over the upper eddy current sensor 6.

In contrast to the course of the motion sensor parameter $U_a$, $U_e$ in FIG. 5, the motion parameter U in FIG. 7, however, does not increase to its initial value $U_{OK,real}$, which is associated with a piston position in which the piston skirt 8 does not cover the first eddy current sensor 6 and the first eddy current sensor 6 no longer detects the piston 3 (i. e. $d>d_{max}$). Instead, the motion parameter U remains below the position parameter value $U_{OK,real}$. This means that the field of the upper eddy current sensor 6 is still influenced by the piston 3. This is due to the fact that the upper eddy current sensor, as shown in FIG. 3, is located much closer to the bottom edge 12 of the piston skirt 8 at the top dead center OT of the piston 3 than is the case, for example, in the first example embodiment of FIG. 2 (i. e. $d<d_{max}$).

The voltage value at the point P at a crank angle γ of about 360° depends on the distance d of the lower edge 12 of the piston skirt 8 from the first eddy current sensor 6, and is in particular proportional to this. The point P or its voltage value $U_{OT}$ therefore indicates a distance d of the lower edge 12 of the piston skirt 8 from the first eddy current sensor 6. The position of the piston can therefore be derived from the position of the point P. This is therefore also a piston position parameter in the sense of the invention.

A compression ratio parameter 104c is preferably determined from the respective value $U_{OT}$ of this piston position parameter. For this, the value $U_{OT}$ is subtracted from the value $U_{OK}$ or $U_{MK}$ of the piston position parameter, so that preferably the values of the compression ratio parameter $\Delta U_1$ or $\Delta U_2$ result. The compression ratio of a reciprocating piston internal combustion engine 1 can be directly inferred from the absolute value of the values $\Delta U_1$ and $\Delta U_2$.

Figure 8:
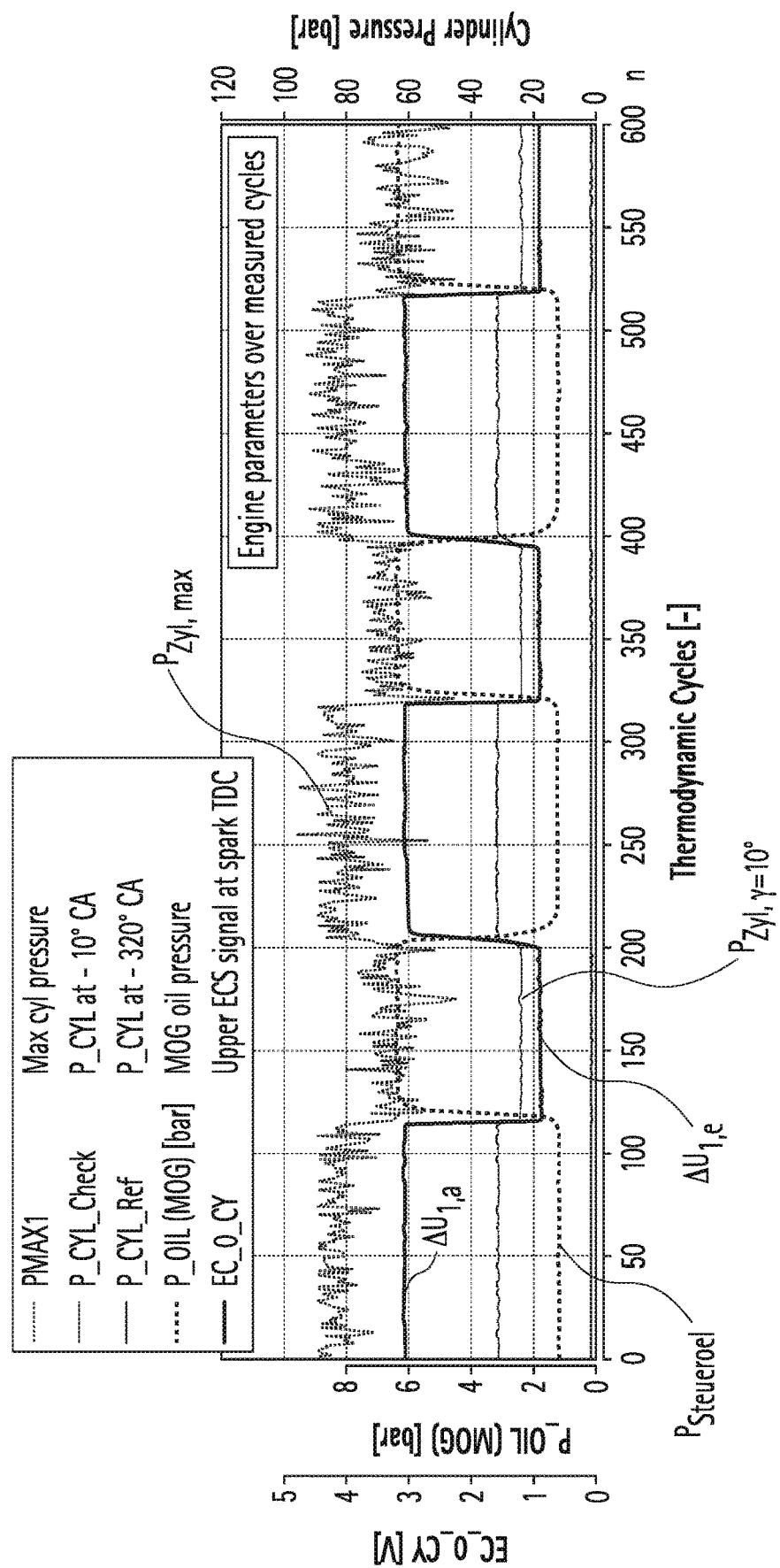
FIG. 8 shows a diagram of an evaluation of the output parameter according to FIG. 7.
Figure 9:
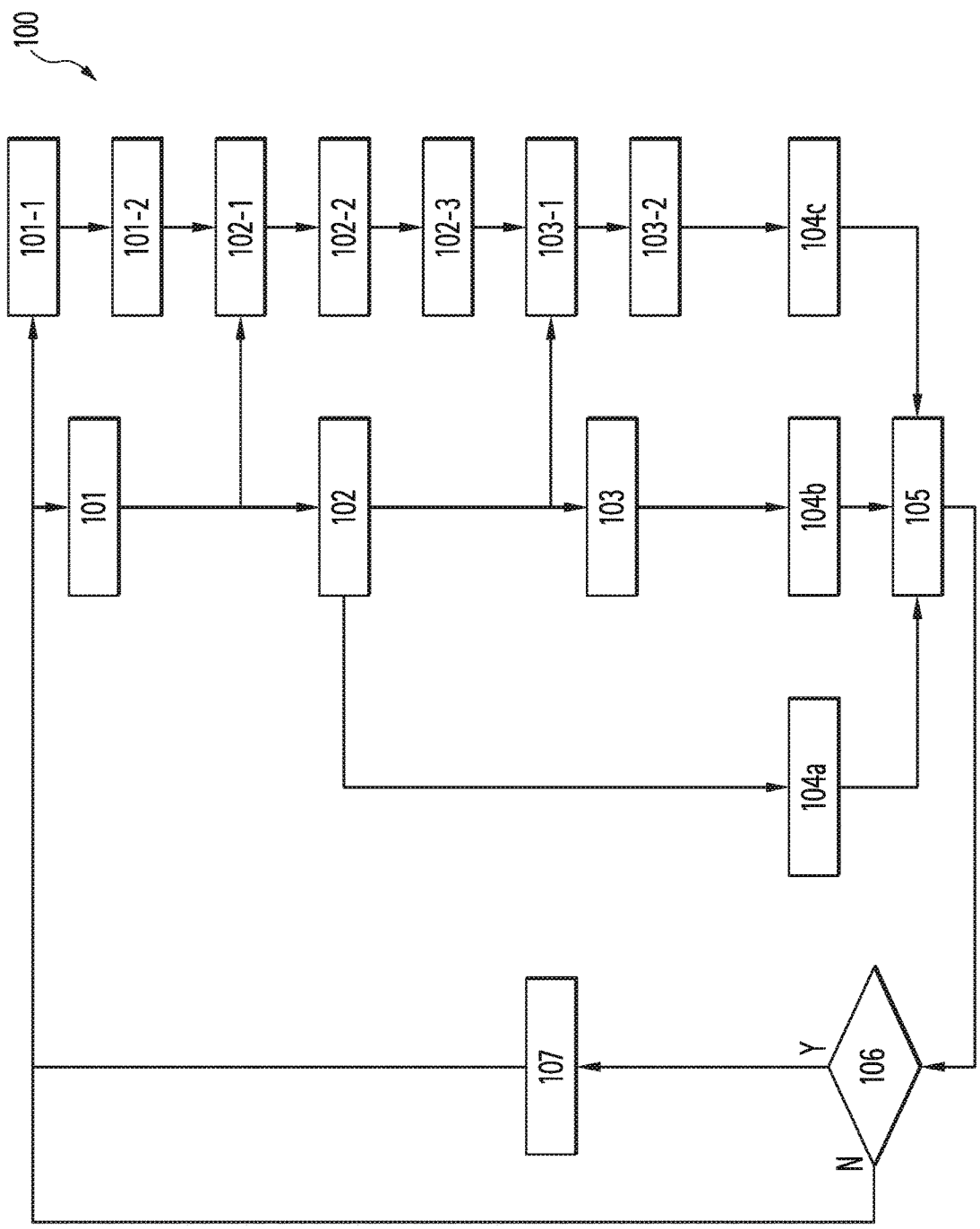
FIG. 9 shows a flowchart of an example embodiment of a method of the diagnosis and/or of the control of a reciprocating piston engine in accordance with the second aspect of the invention.

This is shown in the diagram of FIG. 8. There, the course of the compression ratio parameter $\Delta U_1$ is plotted over a number of thermodynamic cycles of a reciprocating piston internal combustion engine 1. If $\Delta U_1$ reaches a relatively high value of about 3 volts, then this means that the lower edge 12 of the piston 3 is relatively far away from the upper eddy current sensor 6, that the piston rod is therefore extended and that a relative compression ratio ε has been achieved in the respective cylinder 2a, 2b, 2c, 2d. In this range, the compression ratio parameter in FIG. 8 is therefore designated as $\Delta U_{1,a}$. In a corresponding manner, the cylinder pressures at various crank angles γ are also relatively high and the pressure of the control pressure $P_{Steueroel}$, which controls the extendable piston rod 4, is low. From about n=120 thermodynamic cycles, the pressure of the control pressure $P_{Steueroel}$ changes its value and increases. The piston rod 4 retracts accordingly and the compression ratio parameter $\Delta U_1$ determined from the piston position parameters drops. For this reason, the compression parameter in this range is designated as $\Delta U_{1,e}$. Using the respective value of the compression ratio parameter and/or the change in the cylinder pressure $P_{zyl}$, this diagram can be used to determine whether the compression ratio has moved in the desired direction and in particular to the desired value due to a change in the control pressure $P_{Steueroel}$.

Using the respective compression ratio parameter $\Delta U_1$, $\Delta U_2$ it is possible to determine at least qualitatively how the compression ratio in the pistons 2a, 2b, 2c, 2d of a reciprocating piston internal combustion engine 1 has changed. If the relationship between the respective compression ratio parameter $\Delta U_1$, $\Delta U_2$ and the compression ratio ε is defined by means of a maplet, in particular by means of a function or by means of a field, or stored in a data memory, the exact value of a compression ratio ε can also be determined in a further step 105 on the basis of the respective compression ratio parameter Δ, $\Delta_1$, $\Delta U_2$.

For functional testing or diagnosis of the variability of the compression ratio ε of a reciprocating piston internal combustion engine 1, the method may also provide for a change in the compression ratio ε to be actively initiated in order to determine, at various points in time, by means of the respective compression ratio parameters δ, $\Delta U_1$, $\Delta U_2$, whether a change in the compression ratio has taken place.

To this end, a target compression ratio of at least a first cylinder 2a, 2b, 2c, 2d of the reciprocating piston internal combustion engine 1 is preferably set 104 from a first value $\varepsilon_a$, in particular an extreme value $\varepsilon_a$, to a second value $\varepsilon_e$, in particular an extreme value $\varepsilon_e$. After this, a first value $U_{OT,1}$, $U_{UT,1}$ of the motion parameter U at a top dead center OT and/or at a bottom dead center UT and/or the crank angle parameter $\gamma_{1,1}$, $\gamma_{2,1}$, $\gamma_{3,1}$, $\gamma_{4,1}$ for the first value of the target compression ratio $\varepsilon_a$ and of a second value $U_{OT,2}$, $U_{UT,2}$ of the motion parameter U at a top dead center OT and/or a bottom dead center UT or the crank angle parameter $\gamma_{1,2}$, $\gamma_{2,2}$, $\gamma_{3,2}$, $\gamma_{4,2}$ for the second value of the target compression ratio $\varepsilon_e$.

The determination of a value of a relative compression ratio parameter 104c is then carried out on the basis of the first and the second value of the piston position parameter U.

The control device 15 or the method 100 preferably checks whether the respectively obtained value of the compression ratio parameter δ, $\Delta U_1$, $\Delta U_2$ lies outside a predetermined range, in particular whether it falls below a predetermined minimum value which should lie between the maximum and the minimum value when determining the compression ratio 106. If this is not the case or if the compression ratio parameter value lies within the predetermined range (step 106: "N"), the control 15 or the method 100 returns again to step 101 in order to carry out the method 100 again. Otherwise, or if the deviation between the compression ratio parameter value δ, $\Delta U_1$, $\Delta U_2$ for a maximum and a minimum target compression ratio or their differences is too small (step 106: "Y"), the controller 15 outputs a corresponding diagnostic signal in a step 107, which indicates the function of the reciprocating piston internal combustion engine 1 in an inadequate manner, and then returns to step 101.

Although example embodiments have been explained by way of example in the present description, it is pointed out that these example embodiments are merely examples which are not intended to restrict the scope of protection, the application and the construction in any way. Rather, the preceding description provides the skilled person with a guideline for the implementation of at least one example embodiment, whereby various modifications, in particular with regard to the function and the arrangement of the components described, can be made without departing from the scope of protection as it results from the claims and combinations of features equivalent thereto.

LIST OF REFERENCE SIGNS

1 reciprocating piston engine
2a, 2b, 2c, 2d cylinder
3 piston
4 piston rod
5 crankshaft
6 first sensor
7 cylinder wall
8 piston skirt
9 second sensor
10, 11 measuring point/opening
12 lower edge
13 upper edge
14 angle of rotation encoder
15 control unit
30 piston pin axis
31 groove
60, 60' third sensor
300 longitudinal axis of piston
U motion parameter
$U_{MK}$, $U_{OK}$, P piston position parameter
Ü piston speed parameter
γ crank angle parameter
$\gamma_1$, $\gamma_2$, $\gamma_3$, $\gamma_4$ characteristic value of the crank angle parameter
$\varepsilon_a$, $\varepsilon_e$, ε compression ratio
δ, $\Delta U_1$, $\Delta U_2$ compression ratio parameter alpha angle between sensor longitudinal axis and piston pin axis 30
   d distance
   a height (of the groove 31)
   h groove spacing
   w pitch
   l length (of the groove 31)
   KL piston longitudinal plane

The invention claimed is:

1. A system for diagnosis or control of a reciprocating piston engine with a variable compression ratio which comprises at least one cylinder with a piston and a piston rod with a length that can be adjusted, the piston rod being connected to the piston and to a crankshaft, comprising:
   instructions to determine a motion parameter of the piston of the reciprocating piston engine by a relative movement between a piston skirt of the piston and a cylinder wall; and
   instructions to determine at least one of a piston position parameter and a piston speed parameter based on the motion parameter, wherein determining the piston position parameter comprises determining a first minimum value of the motion parameter and a second maximum value of the motion parameter.

2. A reciprocating piston engine, comprising:
   at least one cylinder with a piston and a piston rod which is connected to the piston and a crankshaft of the reciprocating piston engine, wherein a length of the piston rod can be adjusted;
   a first sensor which is arranged in an associated opening of a cylinder wall of the at least one cylinder and which is arranged to detect a relative movement between a piston skirt of the piston and the cylinder wall; and
   a second sensor in an associated opening of the cylinder wall, wherein the first sensor is arranged in such a way as to detect the relative movement in a region of a top dead center of the piston and the second sensor is arranged in such a way as to detect the relative movement in a region of a bottom dead center of the piston.

3. The reciprocating piston engine according to claim 2, further comprising at least a third sensor which is arranged opposite the first sensor with respect to a longitudinal plane of the piston defined by a longitudinal axis of the piston and an axis of a piston pin.

4. The reciprocating piston engine according to claim 3, wherein the first sensor and the third sensor are arranged in a normal plane to the longitudinal axis of the piston in the region of the top dead center of the piston.

5. The reciprocating piston engine according to claim 3, wherein:
   the piston comprises one or more of an electrically conductive and a ferromagnetic material; and
   at least one of the first sensor, the second sensor, and the third sensor is an inductive sensor.

6. The reciprocating piston engine according to claim 3, wherein at least one of the first sensor, the second sensor, and the third sensor is arranged in such a way that the piston skirt completely passes over the at least one of the first sensor, the second sensor, and the third sensor during the relative movement.

7. The reciprocating piston engine according to claim 3, wherein the reciprocating piston engine has a variable compression ratio, and wherein at least one of the first sensor, the second sensor, and the third sensor is arranged in such a way that the piston skirt completely passes over the at least one of the first sensor, the second sensor, and the third sensor only at an at least substantially maximum compression ratio.

8. The reciprocating piston engine according to claim 3, wherein at least one of the first sensor the second sensor, and the third sensor is arranged in such a way that piston rings of the piston do not pass over the sensors during the relative movement.

9. A method for diagnosis or control of a reciprocating piston engine which comprises at least one cylinder with a piston and a piston rod with a length that can be adjusted, the piston rod being connected to the piston and to a crankshaft, comprising:
   determining a motion parameter of the piston of the reciprocating piston engine by a relative movement between a piston skirt of the piston and a cylinder wall;
   determining at least one of a piston position parameter and a piston speed parameter based on the motion parameter, wherein determining the piston position parameter comprises determining a first minimum value of the motion parameter and a second maximum value of the motion parameter; and
   determining a compression ratio parameter based on the piston position parameter and the piston speed parameter.

10. The method according to claim 9, further comprising:
   detecting a rotational position parameter of the crankshaft; and
   determining a crank angle parameter on the basis of the rotational position parameter.

11. The method according to claim 10, further comprising:
   determining the compression ratio parameter based on the piston position parameter and the crank angle parameter.

12. The method according to claim 11, wherein the determining of the piston position parameter further comprises:
   adjusting a target compression ratio of at least a first cylinder of the reciprocating piston engine from a first value to a second value;
   determining at least one of a first value of the piston position parameter and a first value of the crank angle parameter for the first value of the target compression ratio; and
   determining at least one of a second value of the piston position parameter and a second value of the crank angle parameter for the second value of the target compression ratio,
   wherein the determination of a value of the compression ratio parameter is carried out on the basis of the first and second values of one or more of the piston position parameter and the crank angle parameter.

13. The method according to claim 12, wherein the adjustment of a target compression ratio is effected by changing a target length of a piston rod of at least the first cylinder of the reciprocating piston engine.

14. The method according to claim 10, wherein values of at least one of the piston position parameter and of the crank angle parameter are determined by evaluation of a waveform of the motion parameter by evaluating a gradient of the waveform.

15. The method according to claim 9, wherein determining the piston position parameter comprises determining at least one of a first value of the motion parameter at a top dead center and a second value of the motion parameter at a bottom dead center of the movement of the piston; and wherein the method further comprises determining the compression ratio parameter based on the piston position parameter and at least one of the first value and the second value.

16. The method according to claim 15, further comprising determining a value of a compression ratio on the basis of the compression ratio parameter.

17. The method according to claim 16, further comprising outputting a signal on the basis of one or more of the motion parameter, the piston position parameter, the piston speed parameter, the compression ratio parameter, and the compression ratio if the respective parameter satisfies a predetermined condition.

18. The method according to claim 9, wherein the determination of the motion parameter further comprises:
   detecting at least one of an inductive signal and an optical signal which is influenced by the relative movement between the piston skirt of the piston and the cylinder wall; and
   determining the motion parameter on the basis of at least one of the inductive signal and the optical signal.

19. The method according to claim 18, wherein the motion parameter is an electric voltage which is generated by at least one of the inductive signal and the optical signal.

20. The method according to claim 18, wherein at least one of the inductive signal and the optical signal is influenced by one or more of a lower end and an upper end of the piston skirt.

21. The method according to claim 9, wherein a value of the motion parameter depends on at least one of a distance of the piston skirt from a measuring point and on a speed of the relative movement.

22. The method according to claim 9, wherein the piston speed parameter additionally takes into account a distance of the piston skirt from the cylinder wall at a respective measurement time.

23. The method according to claim 9, wherein the motion parameter is determined exclusively for at least one predetermined crank angle range.

24. The method according to claim 23, wherein the at least one predetermined crank angle range at least one of:
   comprises a top dead center of at least one cylinder of the reciprocating piston engine;
   comprises a bottom dead center of at least one cylinder of the reciprocating piston engine; and
   extends over one or more of at least 2° and at most 135°.

* * * * *